Dec. 8, 1970  N. G. FEKETE ET AL  3,546,463
SERVOMOTOR-OPERATED X-RAY SHUTTER CONTROL SYSTEM
FOR USE WITH A SPOTFILM DEVICE
Filed Nov. 22, 1968
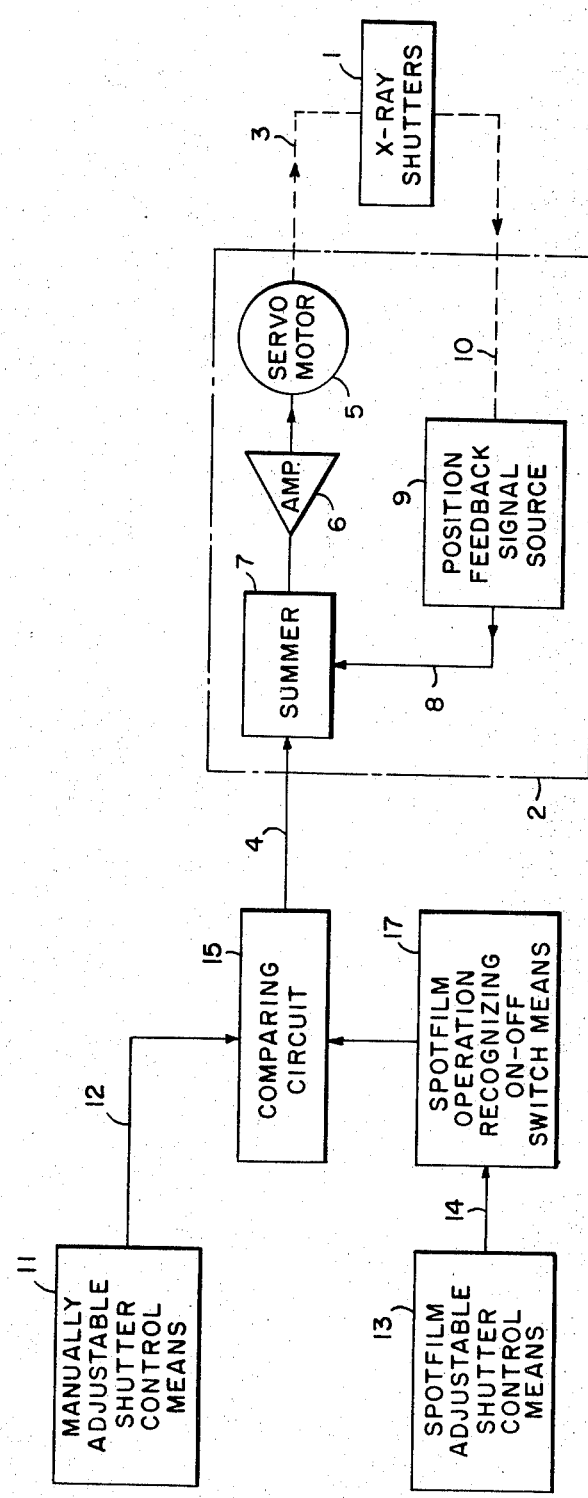
WITNESSES
INVENTORS
Nicholas G. Fekete &
Harry E. Koerner
BY
AGENT United States Patent Office 3,546,463
Patented Dec. 8, 1970

3,546,463
SERVOMOTOR-OPERATED X-RAY SHUTTER CONTROL SYSTEM FOR USE WITH A SPOTFILM DEVICE
Nicholas G. Fekete, Laurel, and Harry E. Koerner, Catonsville, Md., assignors to Westinghouse Electric Corporation, Pittsburgh, Pa., a corporation of Pennsylvania
Filed Nov. 22, 1968, Ser. No. 778,110
Int. Cl. G21f 5/04; H01j 35/16
U.S. Cl. 250—105
2 Claims

ABSTRACT OF THE DISCLOSURE

Described is an improved control system for servo-operated X-ray shutters in which the signal outputs from a manually-adjustable shutter control and from a spotfilm-adjustable shutter control are automatically fed to an auctioneering circuit upon initiating operation of the spotfilm device, and the output signal from the auctioneering circuit, which represents the higher of its two inputs, is fed as the command signal to the servomotor means which actuates the X-ray shutters to separation distances in inverse proportion to such command signal. In effect, the system honors the control signal that calls for the smaller aperture size defined by the shutters.

BACKGROUND OF THE INVENTION

Field of the invention

Servomotor-operated X-ray shutter control systems for use in X-ray tables.

Description of the prior art

Systems have existed heretofore which control servomotor actuation of X-ray shutters in an X-ray table by manually selected control either from a manually-adjustable shutter control means on the spotfilm device above the table or from a spotfilm-adjustable shutter control means within such device. The manual shutter control means provides a signal for adjusting the dimensions of the X-ray image applied to either the fluorescent panel or the image amplifier input screen on the spotfilm device within the area of acceptability of such panel or screen, during fluoroscopic examination. The spotfilm-adjustable control means provides signals for automatically adjusting the dimensions of the X-ray image presented to X-ray film in the spotfilm device according to the selected recording program (one-on-one, two-on-one, or four-on-one, for example) as usually determined by a manually-adjustable program shaft that dictates positioning of the motor-operated film carriage necessary to accommodate the selected program. A mode-selector switch as been employed to selectively effectuate either the manually-adjustable shutter control means or the spotfilm-adjustable shutter control means. If the shutter control means selected by the mode selector switch does not correspond to the technique involved, it is possible to introduce confusion into the X-ray examination, to extend the area of patient exposure beyond that of primary interest, and/or to double expose adjacent film areas during such as four-on-one operation of the spotfilm device.

SUMMARY OF THE INVENTION

In accord with the improvement of the present invention, when the spotfilm device is brought into operation (as by closing a switch to effectuate its operating motor for transport of a film cassette from a park position to an exposure position) signal output from the spotfilm-adjustable shutter control means is automatically fed to a comparing circuit together with signal output from the manually-adjustable shutter control means to derive a command input to the shutter servomotor means that results in realization of the lesser one of the two shutter aperture sizes represented by the two signal outputs. When operation of the spotfilm device terminates, the signal output from the spotfilm-adjustable shutter control means is automatically disconnected from the comparing circuit to result in command input to the shutter servomotor means in recognition of the manually-adjustable control means output only.

This enables the radiologist to select an image size during fluoroscopy by manipulation of the manually-adjustable shutter control means, which may be less than that called for by the spotfilm-adjustable shutter control means, and be assured that such lesser-image-size shutter-positioning will be maintained during a subsequent film-recording operation of the spotfilm device. At the same time, applicants improved arrangement functions to assure that should the aperture size selected by the manually-adjustable shutter control means be larger than that selected by the spotfilm-adjustable shutter control means, the latter control means will be honored by the system to the exclusion of the former, to prevent confusion of the filming technique being performed by the spotfilm device.

BRIEF DESCRIPTION OF THE DRAWING

The single figure is a block diagram of an X-ray shutter control system embodying the improvements of the present invention.

DESCRIPTION OF THE PREFERRED EMBODIMENT

Referring to the drawing, the system of the present invention in which the improvement resides comprises adjustable X-ray shutters 1 of any usual form which are adjustably positioned within an X-ray table (not shown) at the output of an X-ray tube to serve the well-known function of defining the size and shape of the X-ray beam emanating from such X-ray tube and directed toward the usual motor-operated spotfilm device (not shown) disposed parallel to and above the table top and having provision for accepting the usual fluorescent screen panel or the input screen of an image amplifier tube, as well as including motor-operated means for transporting a film cassette to and from different exposure positions in accord with dictates of a manually selective program means which effectuates usual filming techniques such as one-on-one, two-on-one, four-on-one, for example.

A servomotor means 2, is mechanically coupled at 3 to the X-ray shutters 1 for positioning same to obtain an X-ray beam aperture size inversely proportional to the magnitude of a command input 4 to such means 2, which may take a usual form including a servomotor 5 operated from the output of an amplifier 6 fed from a summer 7 which receives the command input 4 for null balancing with an input 8 from a position feedback signal source 9 mechanically coupled at 10 to output of the servomotor 5.

The system further comprises a manually-adjustable shutter control means 11, which usually includes operator's knob or handle means (not shown) operatively connected to potentiometer means (not shown) and disposed on the spotfilm device (not shown), producing an electrical shutter control signal output 12 representing a shutter-defined aperture size inversely proportional to magnitude of such output; and a spotfilm-adjustable shutter control means 13 which usually includes potentiometer means operated by the manually selective program means (not shown) of the spotfilm device producing a signal output 14 representing in inverse magnitude a shutter-defined aperture size commensurate with the film area presented to the beam according to the selected filming program, such one image filling the film sheet, two images on respective halves of such film sheet, or four images on respective quadrants of such film sheet.

In accord with the improvement of the present invention, the signal output 12 from the manually-adjustable shutter control means is fed to a comparing circuit 15 having an output furnishing the command input 4 to the servomotor means 2, which comparing circuit, in the present exemplified system where the greater is the magnitude of such signal output 12 the smaller is the shutter aperture size called for, takes the form of a well-known auctioneering circuit that selects the higher one of two inputs for an output; and the signal output 14 from the spotfilm-adjustable shutter control means 13, is automatically connected and disconnected to the comparing, or auctioneering, circuit 15 as a second input thereto by a spotfilm operation recognizing on-off switch means 17 which can simply take the form of a relay switch responsive to energization and deenergization of the film-transport-effecting operating motor (not shown) in the spotfilm device, or other form suitable for compatibility with such motor which may be non-electrical.

It will be understood from the foregoing, that when the spotfilm device is inoperative, the comparing circuit honors the manual signal output 12 as command for the servomotor means 2 to position the shutters 1 accordingly, and when the spotfilm device is brought into operation, the switch means 17 automatically connects the spotfilm signal output 14 as a second input to the comparing circuit 15 which honors the one of such outputs 12, 14 for command 4 which represents the smaller shutter aperture size.

We claim as our invention:

1. An improvement in X-ray apparatus having,
   a table,
   adjustable X-ray shutters within the table for adjustably collimating an X-ray beam directed toward a spotfilm device above the table which is operable to present different sized areas of a sheet film to the center of such beam,
   servomotor means for actuating the shutters according to dictates of a command signal input,
   a manually-adjustable shutter control means on the spotfilm device for producing a manually-adjusted servomotor control signal output according to desired beam dimensions, and
   a spotfilm-adjustable shutter control means for producing a spotfilm-adjusted servomotor control signal output according to the film-size areas presented to the center of the X-ray beam,
   wherein the improvement comprises,
   a comparing circuit means operable to select whichever one of the manually-adjusted and spotfilm-adjusted servomotor control signal outputs presented as inputs thereto represents the smaller beam size and to present such selected signal output to the servomotor means as command signal input thereto, and
   means including spotfilm-operation-recognizing switch means responsive to initiation of operation of the spotfilm-device to present the manually-adjusted and spotfilm-adjusted servomotor control signal outputs as inputs to the comparing circuit means, and responsive to termination of spotfilm device operation to effect presentation of the manually-adjusted servomotor control signal outputs as command input to the servomotor means to the exclusion of the spotfilm-adjusted servomotor control signal output.

2. The improved X-ray apparatus of claim 1, wherein,
   the magnitude of the two servomotor control signal outputs represents servomotor command information and beam size as affected by shutter adjustment varies in inverse proportion to such magnitude,
   the comparing circuit means is in form of an auctioneering circuit that selects the signal input of higher magnitude for its output, and
   the spotfilm-operation-recognizing switch means connects and disconnects the spotfilm-adjusted servomotor control signal output to one input of such auctioneering circuit upon initiation and termination of spotfilm device operation, respectively, while the manually-adjusted servomotor control signal output remains connected to the other input to the auctioneering circuit.

References Cited
UNITED STATES PATENTS 3,130,313   4/1964   Tilling _____ 250—105

WILLIAM F. LINDQUIST, Primary Examiner

P. M. PECORI, Assistant Examiner

U.S. Cl. X.R.

250—66